2,731,371
ELECTRICAL CONTACT BRUSH

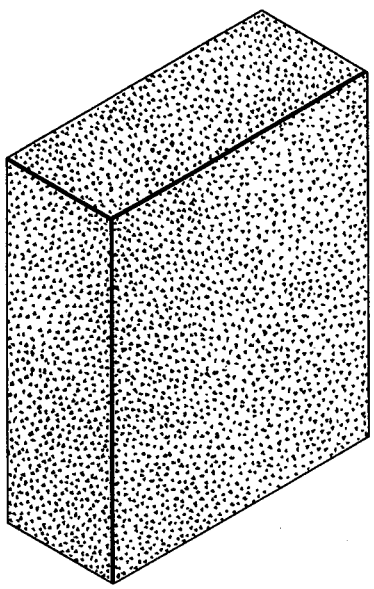
Electrographitic Brush Impregnated
with a
Coumarone-Indene Resin

Dimiter Ramadanoff, Berea, Ohio, assignor to Union Carbide and Carbon Corporation, a corporation of New York Application March 29, 1952, Serial No. 279,319

7 Claims. (Cl. 117—228)

This invention relates to an electrical contact brush of the conventional carbon or graphite type containing coumarone-indene resin.

Among the problems encountered in making electrical contact brushes are those of providing a brush with adequate strength and satisfactory commutating properties. The stresses due to vibration and rubbing that a brush is subjected to during commutation will vary with the type of electrical equipment on which the brush is being used. Certain commutating jobs impose greater mechanical loads on a brush than do others. The requirements as to the commutating properties, for example, the conductivity, film forming, and riding properties, of a brush also differ from one type of electrical equipment to another. In the past, an increase in the strength of a brush has often been achieved at the expense of the commutating properties of the brush. The brush of the present invention combines structural strength and excellent commutating properties for a wide variety of commutating jobs. Brushes made according to the invention have given exceptionally good service at high rubbing speeds against a commutator, as in traction motors of the kind used in diesel-electric locomotives and switcher engines. A brush of the invention suitable for use with such a traction motor will be described in detail; however, it will be understood that the brush is not limited to such uses.

Because of their good commutating properties, electrographitic brushes are widely used. These brushes are made, for example, by molding a mixture of carbon and a binder, and subsequently heating the molded mixture to graphitizing temperatures. The graphitized material is porous, and it has been customary to take advantage of the porosity by impregnating the brush, for instance by placing it first under a vacuum and then under pressure of the impregnant, to incorporate various materials imparting desired characteristics. Because of the rough mechanical treatment to which brushes for traction motors are often subjected, it has been customary to impregnate them with thermosetting resins to impart improved mechanical strength. Such resins have not, however, prevented rapid wear at high rubbing speeds.

The brushes of this invention, suitable for use with traction motors, may be made in the conventional manner by vacuum and pressure impregnation of graphitized brush stock using, however, a solution of coumarone-indene resins as the impregnant. A 50% solution in toluene is satisfactory. After removal from the impregnant solution, the brush should be dried, and then baked, say for one hour at 150° C. Solutions of toluene having a resin concentration higher than 50% and baking temperatures higher than 150° C. for periods longer than one hour can, of course, be used.

In a typical laboratory test simulating severe service conditions, samples of a brush stock containing respectively no impregnant, 3%, 5.5%, and 8% coumarone-indene resins melting at about 150° C., had test lives respectively of 1800, 2000, 2900, and 4350 hours per inch.

Brushes can be evaluated for traction motor service only by actual use in such service. One embodiment of the brush of this invention has been so evaluated. In a group of 77 motors of passenger and freight locomotives, and a total test mileage of nearly one and one half millions, the following brush lives, expressed as miles per one-eighth inch wear, were measured on brushes of the invention, comprising electrographitic brush stock impregnated with a coumarone-indene resin. For comparison purposes, life measurements are shown for two standard grades of brushes run concurrently on other motors in the same locomotives:

| Test | Brush of Invention | Comparison Brushes | |
|---|---|---|---|
| | | 1 | 2 |
| 1 | 63,400 | 28,900 | |
| 2 | 36,000 | 21,700 | 26,800 |
| 3 | 17,300 | 8,675 | 10,400 |
| 4 | 23,800 | 17,550 | 15,000 |
| 5 | 13,400 | 9,200 | 10,300 |

Coumarone-indene resins used in the brush of the invention range in color from pale amber to dark brown. These resins are customarily differentiated from one another in the trade by their melting points. Among those coumarone-indene resins with which satisfactory results have been obtained are a series of resins sold by the Neville Co., Neville Island, Pittsburg 25, Pennsylvania. These resins are sold under the trade name of "Nevindene" resins and different grades of the resin are designated by the letter "R" and a numeral. The melting points of a number of the "Nevindene" type coumarone-indene resins appear below. Both the melting points listed by the Neville Co. in their catalog and the melting points determined by the ASTM ring and ball method E28–42T are given.

| Resin | | Melting Point listed in Catalog | Melting Point by A. S. T. M. Method, ° C. |
|---|---|---|---|
| Type | Grade | | |
| Nevindene | R-3 | 150° C. minimum | 128.5 |
| Nevindene | R-7 | 105°–140° C | 103.3 |
| Nevindene | R-10 | 127°–142° C | 109.7 |
| Nevindene | R-17 | 77°–94.9° C | 90.0 |

In the test of a brush of the invention described above, the resin used was that sold under the designation "Nevindene R-3," and was present in the proportion of about 8% by weight of the brush. Brushes impregnated with the other coumarone-indene resins listed have also given good results. Another example of a suitable coumarone-indene resin is one sold by the Pennsylvania Industrial Chemical Company and designated "450H." This latter resin has a melting point of 110° C. as determined by the ASTM ring and ball method E28–42T. The choice of the particular coumarone-indene resin to be used will depend upon the use to which the brush is to be put. In general, for high rubbing speeds at high temperatures, the higher melting point resins are recommended. In the claims the melting points referred to are those obtained with the ASTM method E28–42T.

The amount of coumarone-indene resin that can be introduced into the brush will depend to an extent upon the porosity of the brush stock. The actual amount of the resin that is desirable will depend upon the strength requirements for the brush and the type of electrical equipment on which it is to be used. In general, the brush of the invention should contain from 5% to 20% coumarone-indene resin by weight with 8% to 15% preferred. Satisfactory results have been obtained with amounts of resin lower than 5% and higher than 20%. The proportions for the resin given are merely illustrative of those that can be employed and are by no means a limitation on the brush of the invention.

The brush stock which is impregnated with a coumarone-indene resin to make the brush of the invention can be any of the conventional grades or types. Among those from which brushes within the invention have been made are carbon, natural graphite, artificial graphite, electrographic material, carbon-graphite, and metal-graphite. In the appended claims the term "carbon" includes such materials as are ordinarily used in making carbon brushes, with or without abrasives or other additives, and the term "graphite" includes both natural and artificial graphite, with or without additives that impart abrasiveness or conductivity to the brush stock.

The drawing shows a brush typical of those within the invention before the attachment of electrical leads. The shape and size of the brush in the drawing are merely illustrative and in no way limit the invention described herein.

This application is a continuation-in-part of application Serial No. 211,440, filed February 16, 1951, now abandoned.

What is claimed is:
1. An electrical contact brush comprising at least one of the materials in the group consisting of carbon and graphite, and coumarone-indene resin.
2. An electrical contact brush comprising brush stock of at least one of the materials in the group consisting of carbon and graphite, impregnated with coumarone-indene resin having a melting point of between about 70° C. and 150° C.
3. An electrical contact brush comprising at least one of the materials in the group consisting of carbon and graphite, and 5% to 20% by weight coumarone-indene resin.
4. An electrical contact brush comprising at least one of the materials in the group consisting of carbon and graphite, and 8% to 15% by weight coumarone-indene resin.
5. An electrical contact brush comprising at least one of the materials in the group consisting of carbon and graphite, and 5% to 20% by weight coumarone-indene resin having a melting point of between about 70° C. and 150° C.
6. An electrical contact brush comprising at least one of the materials in the group consisting of carbon and graphite, and 8% to 15% by weight coumarone-indene resin having a melting point of between about 70° C. and 150° C.
7. An electrical contact brush of the type used in making a sliding electrical contact with a rotating element of an electrical device comprising at least one of the materials in the group consisting of carbon and graphite, said material being impregnated with a coumarone-indene resin.

References Cited in the file of this patent
UNITED STATES PATENTS

| | | |
|---|---|---|
| 1,594,810 | Benner | Aug. 3, 1926 |
| 2,224,724 | Elsie | Dec. 10, 1940 |
| 2,285,416 | Corkery | June 9, 1942 |
| 2,453,174 | Wright | Nov. 9, 1948 |